US008342241B2

(12) United States Patent
Hartshorne et al.

(10) Patent No.: US 8,342,241 B2
(45) Date of Patent: Jan. 1, 2013

(54) DELIVERY OF NANODISPERSIONS BELOW GROUND

(75) Inventors: Robert Seth Hartshorne, Newmarket (GB); Khooi Yeei Tan, Coton (GB); Gary John Tustin, Sawston (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 447 days.

(21) Appl. No.: 12/642,212

(22) Filed: Dec. 18, 2009

(65) Prior Publication Data

US 2011/0146974 A1     Jun. 23, 2011

(51) Int. Cl.
    *E21B 43/22*      (2006.01)
    *E21B 47/10*      (2006.01)
    *C09K 8/92*      (2006.01)
(52) U.S. Cl. .............. 166/252.6; 166/275; 166/300; 166/305.1; 507/904; 507/907; 977/902
(58) Field of Classification Search ............ None
See application file for complete search history.

(56) References Cited

U.S. PATENT DOCUMENTS

| | | | |
|---|---|---|---|
| 4,485,875 A | 12/1984 | Falk | |
| 4,777,200 A | 10/1988 | Dymond et al. | |
| 4,787,451 A | 11/1988 | Mitchell | |
| 4,986,353 A | 1/1991 | Clark et al. | |
| 5,175,277 A * | 12/1992 | Rakitsky et al. | 536/114 |
| 5,447,986 A | 9/1995 | Fox et al. | |
| 7,544,720 B2 | 6/2009 | Cooper et al. | |
| 7,985,423 B2 | 7/2011 | Cooper et al. | |
| 2002/0156159 A1 | 10/2002 | Amdur | |
| 2007/0015678 A1* | 1/2007 | Rodrigues et al. | 510/320 |
| 2007/0225388 A1 | 9/2007 | Cooper et al. | |
| 2007/0298239 A1 | 12/2007 | Cooper et al. | |
| 2008/0064612 A1 | 3/2008 | Xiang | |
| 2008/0221231 A1 | 9/2008 | Cooper et al. | |
| 2008/0223578 A1 | 9/2008 | Berkland et al. | |
| 2008/0226721 A1 | 9/2008 | Cooper et al. | |
| 2008/0241040 A1* | 10/2008 | Clothier et al. | 423/263 |
| 2011/0059876 A1* | 3/2011 | Takahama et al. | 508/113 |
| 2011/0067603 A1* | 3/2011 | Constantz et al. | 106/739 |
| 2012/0037840 A1* | 2/2012 | Stucky et al. | 252/62.53 |

OTHER PUBLICATIONS

Awang et al., "Development of a Correlation for Estimating Gelation in Porous Media Using Bottle Test Measurements," SPE Society of Petroleum Engineers Paper 84862, 2003 International Improved Oil Recovery Conference, Oct. 2003: pp. 1-6.
Cameron, "High internal phase emulsion templating as a route to well-defined porous polymers," Polymer, 2005, vol. 46: pp. 1439-1449.
Del Gaudio et al., "Nanoemulsions: A New Vehicle for Chemical Additive Delivery," SPE Society of Petroleum Engineers Paper 106016, 2007 SPE International Symposium on Oilfield Chemistry, Feb.-Mar. 2007: pp. 1-9.
Horn et al., "Organic Nanoparticles in the Aqueous Phase-Theory, Experiment, and Use," Angew. Chem. Int. Ed., 2001, vol. 40: pp. 4330-4361.
Hutchins et al., "Field Applications of High Temperature Organic Gels for Water Control," SPE Society of Petroleum Engineers Paper 35444, 1996 SPE/DOE Tenth Symposium on Improved Oil Recovery, Apr. 1996: pp. 419-426.
Izquierdo et al., "The influence of surfactant mixing ratio on nano-emulsion formation by the pit method," Journal of Colloid and Interface Science, 2005, vol. 285: pp. 388-394.
Landfester et al., "Formulation and Stability Mechanisms of Polymerizable Miniemulsions," Macromolecules, 1999, vol. 32: pp. 5222-5228.
Müller et al., "Nanosuspensionen—Formulierungen für schwerlösliche Arzneistoffe mit geringer Bioverfügbarkeit," Pharm. Ind., 1999, vol. 61: pp. 74-78. English Summary Only.
Anonymous, "Material Safety Data Sheet Oil red O MSDS," Sciencelab.Com, Houston, Texas 77396, 1997-2005: pp. 1-5, <http://www.sciencelab.com/msds.php?msdsld=9925506>.
Texter, "Precipitation and Condensation of Organic Particles," J. Dispersion Science and Technology, 2001, vol. 22 (6): pp. 499-527.
Whitney et al, "Water Shut-off in the North Sea: Testing a New Polymer Gel System in the Heather Field, UKCS Block 2/5," SPE Production & Facilities Paper 30426, May 1996: pp. 108-112.
Zhang et al, "Synthesis and applications of emulsion-templated porous materials," Soft Matter, 2005, vol. 1: pp. 107-113.
Zhang et al., "Formation and enhanced biocidal activity of water-dispersable organic nanoparticles," Nature Nanotechnology, Aug. 2008, vol. 3: pp. 506-511.
Horn et al., "Preparation and characterization of nano-sized carotenoid hydrosols," Fine Particles Science and Technology, Ed. Pelizzettr (ed.), Kluwer Academic Publishers: Dordrecht, 1996: pp. 761-775.
International Search Report and Written Opinion of PCT Application No. PCT/IB2010/002803 (57.0883WOPCT) dated Jul. 21, 2011.
Yalkowsky et al., "Handbook of Aqueous Solubility Data," CRC Press: Boca Raton, Second Edition, 2010: p. 864.
Anonymous, "Ethyl Orange, Sodium Salt MSDS," Sciencelab.Com, Houston, Texas 77396, 1997: pp. 1-5, <http://www.sciencelab.com/msds,php?msdsld=9923996>.

\* cited by examiner

*Primary Examiner* — George Suchfield

(57) ABSTRACT

Delivery of a substance to a subterranean location is achieved by suspending the substance as nanoparticles in a carrier fluid in which the substance is insoluble. First a dispersible powder composition, is formed by dissolving the substance in a solvent, emulsifying the resulting solution as the dispersed phase of an emulsion, and freeze-drying the emulsion to a powder. On mixing the powder with a fluid in which the substance is insoluble, the insoluble substance becomes a dispersion of nanoparticles which is pumped to the subterranean location. At the subterranean location a tracer dispersed as nanoparticles may migrate from injected water into hydrocarbon in a hydrocarbon reservoir. Another possibility is that the carrier fluid contains polymer and the dispersed nanoparticles comprise an agent which participates in cross-linking and consequent viscosification of the polymer at the subterranean location.

15 Claims, No Drawings

DELIVERY OF NANODISPERSIONS BELOW GROUND

FIELD OF THE INVENTION

This invention is concerned with delivery of chemical additives to subterranean locations accessed through wellbores. In some forms of the invention the subterranean location is a hydrocarbon reservoir or a carbon dioxide storage facility.

BACKGROUND OF THE INVENTION

As is well known, a number of chemicals are used as additives in fluids delivered to subterranean locations. For instance a fluid used for hydraulic fracturing might contain cross linkers, biocides and/or scale inhibitors. Water which is injected into a subterranean reservoir to bring about secondary oil recovery might include biocides and/or corrosion inhibitors.

It is well known to carry a chemical additive to a location below ground by dissolving the additive in a carrier fluid. Of course this possibility is not available if the additive which it is desired to use (eg an additive having desirable functionality combined with an economical cost) is insoluble in the carrier fluid. Thus water which is being injected below ground is an unsuitable carrier for hydrophobic additives. Of course it is well known to convey solids as a suspension in a thickened liquid, as is commonly done when carrying out hydraulic fracturing, but the carrying liquid then needs to be designed as a thickened carrier and the energy required for pumping is greatly magnified.

Of relevance to some forms of the invention disclosed below is the use of tracers in water which is injected into a subterranean location. Detection of tracer in water which is subsequently produced from below ground may provide some information about paths of flow below ground and some information about residence time of water in its passage below ground from the injection well to the production well. However, there is at present no technology available which will show whether the injected water makes contact with oil during passage through the reservoir.

Of relevance to some other forms of this invention is the crosslinking of thickening polymers to further increase viscosity. The ability to delay cross-linking has always been a highly desirable property for a number of wellbore service fluids, notably including fracturing fluids. For example in fracturing, the ideal scenario is that the fluid has low viscosity while it is at the surface and whilst it is being pumped down the wellbore, after which the viscosity increases. This would result in a reduction in the overall energy requirements for pumping due to the low viscosity whilst the fluid is in transit at the surface and within the wellbore.

A number of systems are known where a fluid includes a thickening polymer, and a cross linking agent is used to bring about cross linking. Ideally, the action of the cross linking agent is delayed until the fluid has been pumped to a downhole location. Polysaccharides, especially guar are commonly used as thickening polymers. Borate is a common cross linker for polysaccharides but it is also known to use other cross-linking agents including zirconates and titanates. Chromium ions can be used as cross-linkers, especially of polyacrylamides.

One system which can be used to cross-link a variety of polymers which contain hydroxyl, amino, amide or even thiol groups, especially polyacrylamides, is a combination of an aldehyde and a phenolic compound as for example discussed in U.S. Pat. No. 4,485,875 which names formaldehyde, acetaldehyde and glyoxal (a dialdehyde) with a preference for formaldehyde. Aldehydes alone can bring about crosslinking, but incorporation of phenol into the cross-linking system gives a highly activated cross-linking agent and, in the presence of polyacrylamide, results in the formation of gelled fluids with thermal stability at elevated temperatures (i.e. above 90° C.). Unfortunately the deployment of phenol is problematic. Phenol is toxic, causes burns and is hygroscopic. Furthermore, the use of phenol precursors which would mitigate these risks, such as phenyl acetate (PhOAc) or salicylate (PhSal), mentioned in U.S. Pat. No. 5,447,986 for instance, is problematic due to both of these compounds being poorly water soluble. The phenol precursors float upwards in water before they undergo hydrolysis to generate the phenol. A concentration gradient is thus generated comprising a high concentration of phenol at the top of the solution and virtually none at the bottom. As a result, the gel which is formed is therefore non-homogeneous, being 'over cross-linked' at the top (resulting in syneresis) and 'under cross-linked' at the bottom (weak, poorly viscous gel).

SUMMARY OF THE INVENTION

This invention recognizes that formation of a dispersion of very small particles provides a way to convey a chemical additive to a location below ground by means of a fluid in which it is insoluble. The fluid does not need to be thickened (although the invention can be used with a thickened fluid, if desired). We have found that chemical additives can be delivered by means of a fluid in which they are insoluble by putting them into a form which, when mixed with the fluid, becomes a dispersion of nanoparticles containing the additive.

We have found that these dispersions exhibit surprising stability. It might be feared that these dispersions would be easily broken through incidental or accidental contact with a solvent for the dispersed material. This could be a significant obstacle in the context of access to subterranean locations where fluids must pass through machinery and through a wellbore which has previously been used to carry other fluids. We have, however, observed that these dispersions can remain largely unbroken for a useful length of time when they come into contact with a solvent for the dispersed phase. Moreover, the stability of these dispersions provides a way to delay the eventual availability of the dispersed material so that it becomes available when required, in response to conditions encountered below ground.

According to a first aspect of this invention, a method of delivering a substance to a subterranean location comprises:

forming a dispersible powder composition by dissolving the substance in a solvent, emulsifying the resulting solution as the dispersed phase of an emulsion, and freeze-drying the emulsion to a powder;

mixing said powder with a fluid in which the substance is insoluble, thereby forming a dispersion of very small particles of the substance in the fluid, and pumping the fluid containing the dispersed substance to the subterranean location.

Such a process of making a dispersible powder, for use in other applications, has been disclosed as such in WO2005/073296 and WO2005/073300, the disclosures of which are incorporated herein by reference. An example of the use of this procedure to make a nanodispersion also appears at Nature Nanotechnology vol. 3 page 506 (2008). The objective in these prior disclosures was to make a water-insoluble substance present in an aqueous fluid and thereby make it available. The process leads to powders with water soluble constituents which dissolve readily when added to water, while the water-insoluble material in the powder becomes a nano-dispersion in the water phase. The article in Nature Nanotechnology states that its aqueous dispersions achieve an enhanced activity of the antimicrobial which is nanodispersed. In the present invention the formation of a dispersion of very small particles enables them to be transported to a subterranean location. The soluble constituents of the powders dissolve when added to the fluid which will be pumped to the subterranean location while the insoluble constituents (which in this invention comprise the chemical additive to be conveyed to the subterranean location) become dispersed in the fluid as very small particles.

The very small dispersed particles are generally sufficiently small to class as nanoparticles, having a size not exceeding 800 nm, and possibly a size in a range from 1 nm up to 500 nm. Although the particles are present as a dispersion and not a true molecular solution, they are very slow to separate from the fluid because of their very small size. Consequently the fluid with the substance dispersed in it mimics the behaviour of a molecular solution of the substance.

It is possible that the substance to be delivered below ground could be hydrophilic, while the fluid which carries it could be hydrophobic. For example a hydrophilic additive might be carried in a hydrophobic solvent injected into a wellbore for the purpose of cleaning out the near wellbore region of a reservoir. In this event the emulsion which is freeze dried to a dispersible powder may have an aqueous solution as its dispersed phase in a continuous phase of a hydrophobic organic solvent.

In other embodiments of this invention, the substance to be delivered will be a hydrophobic additive and it will be suspended in an aqueous liquid which is injected into the subterranean location. In this event, for making the dispersible powder, the substance of interest will generally be dissolved in an organic hydrophobic solvent to become the dispersed phase of the emulsion which is freeze-dried while the continuous phase is an aqueous solution.

The continuous phase of an emulsion will generally need to contain solutes which stabilize the emulsion. As taught in WO2005/073296 and WO2005/073300, the continuous phase of an aqueous emulsion may contain water soluble surfactant or water-soluble polymer. We have observed that a water soluble surfactant, which may be an anionic surfactant, can be used in an aqueous continuous phase and that an oil-soluble surfactant, which may again be anionic, can be used in a hydrophobic continuous phase.

Freeze drying is a well-known process in which a liquid composition is frozen to a solid state and the constituents which would be liquid at room temperature are removed by direct evaporation from the solid-state. As applied here, solvent from both the continuous and dispersed phases is removed by evaporation from the solid-state after freezing. In many embodiments of this invention, one solvent which will be removed by the freeze drying process will be water. Another solvent which is removed will be an organic solvent which should therefore be chosen to have sufficient volatility to be removed by evaporation during the freeze-drying procedure.

A number of organic solvents are suggested in WO2005/073296, including alkanes, such as heptane, hexane, isooctane, decane, dodecane; cyclic hydrocarbons, such as toluene, xylene, cyclohexane; halogenated alkanes such as dichloromethane, dichloroethane, trichloromethane (chloroform), fluorotrichloromethane and tetrachloroethane; esters such as ethyl acetate; ketones such as 2-butanone; ethers such as diethyl ether; and volatile cyclic silicones such as cyclomethicone.

It may be useful for the solvent of the dispersed phase to have a freezing point above that of the continuous phase. WO2005/073296 suggests cyclohexane as a preferred solvent within a dispersed hydrophobic phase.

As is conventional in many freeze drying procedures, it is desirable that freezing takes place rapidly, by exposure to a temperature substantially lower than the freezing points of all solvents present.

Although this invention is not restricted to any specific proportions, it is envisaged that the concentration of the dispersed substance in the fluid which is pumped below ground will often be less than 5% by weight, possibly less than 1% or even less than 0.1% by weight of that fluid. It will generally be the case that the substance of interest is no more than 20% by weight of the dispersible powder which is formed by freeze-drying an emulsion.

After the fluid has reached a subterranean location, the dispersed substance in the fluid may migrates into another fluid encountered at that location. One development extending this invention is concerned with a circumstance where the fluid is aqueous and the dispersed substance is hydrophobic and so is oil soluble. The dispersed substance acts as a tracer. When the aqueous fluid containing the dispersed substance is pumped into the subterranean location, it may contact oil. On contact with oil within the porous subterranean formation (where formation rock is likely to provide a strong mixing action and also a temperature higher than the ambient temperature at the surface) the dispersed chemical migrates into the oil. Produced oil is analyzed and if the substance is detected in the oil, this is evidence that the oil has been in contact with the injected aqueous fluid.

Thus in a second aspect, this invention provides a method of investigating flow in a subterranean reservoir where an injected aqueous fluid may come into contact with a hydrocarbon fluid, comprising introducing a water-insoluble tracer compound into the aqueous fluid as a dispersion and examining hydrocarbon produced from the reservoir for the presence of the tracer compound. The tracer may be injected over a limited period of time within a longer period of injecting aqueous fluid, so that a "slug" of injected aqueous fluid contains tracer.

This aspect of the invention may be combined with a conventional observation of residence time of water below ground. For this, a quantity of water-soluble tracer is dissolved as a true molecular solution in a slug of the injected water. Water which is subsequently produced along with the hydrocarbon is then analysed for this tracer so that the time delay between injection of tracer and its appearance in produced fluid can be measured.

Dispersion in the form of very small particles may serve to delay interaction between the dispersed substance and one or more constituents of the fluid in which it was dispersed until the fluid has reached a subterranean location. This delayed interaction may be cross-linking and consequent increase in viscosity. Thus in another development extending this invention, the fluid is an aqueous solution of a thickening polymer while a substance dispersed in the fluid as very small particles is an agent which causes or participates in cross linking of the thickening polymer. The cross-linking agent may possibly be dispersed in the form of a precursor for a substance which participates in cross-linking. The stability of the dispersion, which we have observed, will keep the cross-linking agent in a dispersed state for a period of time while the fluid is pumped downhole. Then, exposed to the subterranean conditions which are likely to include a temperature higher than at the surface, the cross-linking agent can undergo conversion from its precursor form (if it is in a precursor form) and can come into effective contact with the thickening polymer and cause cross linking to take place below ground.

Thus in a third aspect, this invention provides a method of increasing the viscosity of an aqueous fluid containing thickening polymer by cross-linking the polymer, characterized by providing a cross-linking agent or precursor therefor as a dispersion of very small particles, especially as a dispersion of nanoparticles, in the aqueous fluid.

The cross-linking system may be a combination of an aldehyde and a phenolic compound. In one form of this aspect of the invention the aqueous fluid contains a formaldehyde precursor while an insoluble substance dispersed as very small particles in the fluid is a hydrophobic precursor of a phenolic compound, to which it decomposes when exposed to elevated temperature below ground.

It is convenient if the dispersed substance is a precursor of phenol itself. However, the substance could be a precursor for another aromatic compound which has a phenolic hydroxyl group, such as a homologue or a substituted derivative of phenol. Generally the polymer to be cross-linked should contain hydroxyl, amino or amide groups prior to crosslinking and this aspect of the invention may in particular be applied to polymers containing residues of acrylamide and/or its homologues.

These second and third aspects of the invention are preferably carried out using nanodispersions formed by dispersing a freeze dried powder in accordance with the method of the first aspect of this invention. However it will be appreciated that for these aspects of the invention the nanodispersion could possibly be formed by some other route. For example it is known to form nanoemulsions by high energy mixing processes such as ultrasonication as for instance discussed by Landfester et al, Macromolecules, vol 32 pages 5222 to 5228 (1999). Another, lower energy route to nanodispersions is the phase inversion temperature method, as described in, for instance, Izquierdo et al, J. Coll. Interface. Sci. vol 285, pages 388-94 (2005).

The invention will now be further described and illustrated with reference to the following examples.

EXAMPLE 1

A procedure similar to that given by Zhang et al at Nature Nanotechnology, vol 3 page 506 (2008) was used. 2.5 mg of an azo dye with the common name Oil Red, which is 1-([4-(xylylazo)xylyl]azo)-2-naphthol, was dissolved in 25 ml cyclohexane. This was slowly added to an aqueous solution of 5 gm sodium dodecyl sulfate (SDS) in 25 ml water which was stirred at 400 rpm using an overhead electric stirrer (Heidolph RZR 2050) with a crossed blade impeller to form an oil-in-water emulsion. After 15-30 minutes of continuous mixing, the emulsion was transferred to a borosilicate freeze-drying flask (Bioprocess Systems, UK) and was frozen by slowly immersing the flask in liquid nitrogen. The frozen emulsion was then freeze-dried (BenchTop 2K freeze dryer, Virtis) by subjecting it to a vacuum of 10-50 milliTorr at minus 55° C. for a minimum of 12 hours to form a highly porous powder containing Oil Red and SDS in a 0.5:99.5 weight ratio.

An alternative approach to freeze drying, leading to a product in bead form was to drip the emulsion from a syringe directly into liquid nitrogen to form frozen beads, and subject these to the freeze drying conditions after evaporation of the liquid nitrogen.

100 mg of the above powder incorporating 0.5 mg Oil Red and 99.5 mg SDS was added to 15 ml deionised water at room temperature of approximately 20° C. It appeared to 'dissolve' instantly resulting in formation of a transparent deep red-coloured liquid with the visual appearance of a single phase solution (although it was in reality a dispersion). This demonstrated that the highly porous structure of the powder and the distribution of Oil Red and SDS molecules in it contributed to the instantaneous formation of a 'nanoparticular'dispersion upon contact with water.

By contrast, when the equivalent amount (0.5 mg) of Oil Red was added directly to 15 ml deionised water and mixed, it did not dissolve and the water remained colourless even after 64 hours at room temperature. Most of the dye was seen to be floating on the surface of the water. When the equivalent amounts of Oil Red and SDS (i.e. 0.5 mg of Oil Red and 99.5 mg SDS) were both added to 15 ml deionised water and mixed, it was observed that the surfactant did enable some of the Oil Red to dissolve slowly, but the solution was only pale pink after 64 hours at room temperature.

EXAMPLE 2

100 mg of the above powder was added to 20 ml deionised water and thoroughly mixed, resulting in formation of a transparent deep red coloured liquid as in the previous Example. Immediately after mixing and again after periods of 30, 60 and 90 minutes a sample of about 4-5 ml was taken from the liquid and filtered through a 45 micron filter. The intensity of light absorption at 528 nm was measured, and did not change from one sample to another. This confirmed that dissolution of the SDS and dispersion of the dye as particles small enough to pass the 45 micron filter, was completed virtually instantaneously on addition to water.

Comparison experiments were carried out using the equivalent amount (0.5 mg) of Oil Red added directly to 20 ml deionised water and equivalent amounts of Oil Red and SDS (0.5 mg and 99.5 mg respectively) added to water. In both cases the absorption at 528 nm was almost zero, even after 90 minutes, indicating that negligible dissolution of the dye had occurred within this time.

EXAMPLE 3

To investigate the effect of exposure to oil, 100 mg of the powder prepared as in Example 1 was added to 20 ml deionized water and thoroughly mixed as in the previous Example. 5 ml toluene was then added and the liquids were again thoroughly mixed. The appearance of the sample was observed at four stages:

i) as soon as the aqueous and toluene phases had separated from each other;

ii) after 100 minutes at room temperature of approximately 20° C.;

iii) after a further 42 hours at the same temperature; and lastly iv) after a further 2.5 hours, in an oven at 70° C.

Comparison experiments were again carried out using the equivalent amount (0.5 mg) of Oil Red added directly to 20 ml deionised water and equivalent amounts of Oil Red and SDS (0.5 mg and 99.5 mg respectively) added to water.

The observations of the samples are given in the following table:

|  | Directly after preparation | 100 minutes storage at RT | 42 hours storage at RT | Additional 2.5 hours at 70° C. |
| --- | --- | --- | --- | --- |
| Freeze dried powder added to water | Oil Red remains dispersed. Toluene layer is colourless | Slight pink colour in toluene layer | Pink colour in toluene layer | Both layers same colour. Aqueous phase is cloudy |
| Oil Red only added to water | Oil Red dissolves in toluene | No further change | No further change | No further change |
| Oil Red and SDS added to water | Neither layer is coloured | Toluene layer slightly pink | Both layers pink | Both layers pink. Aqueous phase is cloudy |

These results indicate that at room temperature the nanodispersion of dye remained surprisingly stable when it came into contact with toluene. From this it can be predicted that an aqueous nanodispersion of a hydrophobic oilfield chemical will not lose its dispersed phase by immediate migration into to oil encountered during mixing at the surface or encountered during pumping down a wellbore. However, when there is contact with oil under reservoir conditions of elevated temperature and longer contact time, the dispersed oil will transfer from the aqueous phase into the oil phase, whereas if there is little or no contact with oil the dye will be retained as the dispersion in the aqueous phase. Hence, this system, with a hydrophobic tracer as a nanodispersion in an aqueous phase, can be used as a tracer to determine oil-water contact in wells, particularly those on water injection.

It could be desirable in addition to introduce a hydrophilic tracer, such as water soluble dye, into the water which is injected, so that residence time can be determined at the same time as detecting oil contact by means of this invention.

EXAMPLE 4

In this example a porous powder was prepared containing a water soluble dye and an oil soluble surfactant. 25 mg of the water soluble dye Ethyl Orange, which is 4-(4-diethylaminophenylazo)benzenesulfonic acid sodium salt, was dissolved in 25 ml deionised water. Similarly to the procedure of Example 1, this solution was slowly added to a solution of 1.25 gm dioctyl sulphosuccinate sodium salt in 25 ml toluene. After 15-30 minutes of continuous mixing, the resulting emulsion was transferred to a borosilicate freeze-drying flask and was frozen by slowly immersing the flask in liquid nitrogen. The frozen emulsion was then freeze-dried by subjecting it to a vacuum of 10-50 milliTorr at minus 55° C. for a minimum of 12 hours to a powder which contained 1.96 wt % Ethyl Orange.

50 mg of this powder, containing 0.98 mg Ethyl Orange, was added to 15 ml toluene. The mixture immediately became a yellow-orange coloured dispersion of Ethyl Orange in toluene. This dispersion was visually indistinguishable from a true molecular solution. In a second experiment 250 mg of the powder was added to 15 ml toluene. Again the mixture immediately formed an orange dispersion of Ethyl Orange in the toluene. By contrast when 0.98 mg of Ethyl Orange was added directly to toluene it did not dissolve and even after 24 hours standing at room temperature the toluene remained colourless.

EXAMPLE 5

A dispersed powder containing 9.1 wt % phenyl salicylate (PhSal) which is a phenol precursor and a balance of SDS was prepared at by the formation of an emulsion and freeze-drying in a similar procedure to that used in Example 1 above.

420 mg of the above powder, containing 38 mg PhSal was added to 20 ml deionised water and thoroughly mixed. As in Example 2 above, immediately after mixing and again after periods of 30, 60 and 100 minutes a sample of about 4-5 ml was taken from the liquid and filtered through a 45 micron filter. The intensity of uv light absorption at 310 nm was measured, and used to calculate the concentration of PhSal in solution. It was observed that the concentration was 0.054 wt % directly after adding the powder to water, rising only slightly to 0.060 wt % after 100 minutes standing at room temperature. When PhSal alone was added to deionised water the uv absorption at 310 nm showed that the concentration dissolved in water was negligible When equivalent amounts of PhSal and SDS were added to water the concentration of PhSal in solution was observed to rise during storage for a period of 90 minutes at room temperature but reached a concentration of only 0.017 wt %.

EXAMPLE 6

This example demonstrated cross-linking of a thickened aqueous phase using precursors of formaldehyde and phenol. One experiment (S1) was carried out using the powder of Example 5 while comparison experiments (C1 to C4) used an equivalent amount of PhSal, phenyl acetate (PhOAc) or phenol itself. For each experiment a 20 gm sample aqueous mixture was prepared containing polyacrylamide together with hexamethylene tetramine (HMTA) as a formaldehyde precursor. It decomposes when heated generating formaldehyde and ammonia.

Many of the materials were added to the sample mixtures in the form of stock solutions. The content of the various samples is set out in the following table. The samples were prepared in bottles which could be closed and then heated. All the sample formulations were chosen to contain 18.7 mmole phenol after decomposition of the phenol precursor, corresponding to a concentration of 0.935 molar. All the samples were adjusted to pH 4.3 with glacial acetic acid.

| Materials | S1 | C1 (mg) | C2 (mg) | C3 (mg) | C4 (mg) | Concentration |
|---|---|---|---|---|---|---|
| Freeze dried powder containing 9.1 wt % PhSal | 440 mg | | | | | 0.935 molar PhSal |
| SDS | | | | 400 mg | | |
| PhSal | | | | 40 mg | 40 mg | 0.935 molar PhSal |
| PhOAc | | 25.4 mg | | | | 0.935 molar PhOAc |
| phenol | | | 17.6 mg | | | 0.935 molar phenol |
| KCl, 20 wt % | 3 gm | 3 gm | 3 gm | 3 gm | 3 gm | 3 wt % KCl |
| NH$_4$Cl, 20 wt % | 2 gm | 2 gm | 2 gm | 2 gm | 2 gm | 2 wt % NH$_4$Cl |
| Polyacrylamide, 20 gm/litre | 7.5 gm | 7.5 gm | 7.5 gm | 7.5 gm | 7.5 gm | 0.75 wt % polyacrylamide |
| Hexamethylene tetramine (HMTA), 10 wt % | 200 mg | 200 mg | 200 mg | 200 mg | 200 mg | 0.1 wt % HMTA |
| Deionized water | 6.86 gm | 7.27 gm | 7.28 gm | 6.86 gm | 7.26 gm | |

Once the samples had been prepared they were placed in an oven at 100° C. and observed after storage at this temperature for periods of time. The sample prepared using the freeze dried powder gave the best gel in terms of homogeneity, stability and strength over time. An adhesive, tonguing gel remained after 140 hours. The use of phenyl acetate (PhOAc), phenylsalycilate (PhSal) or phenol itself, added directly in samples C1, C2 and C4 respectively, led to the initial formation of strong gels, but these degraded more rapidly, becoming non-uniform and more fluid within 140 hours. Comparative sample C3 was somewhat better, but after 185 hours some separation within the sample could be seen whereas sample S1 was still uniform.

The invention claimed is:

1. A method of delivering a substance to a subterranean location comprising:
    forming a dispersible powder composition by dissolving the substance in a solvent, emulsifying the resulting solution as the dispersed phase of an emulsion, and freeze-drying the emulsion to a powder;
    mixing said powder with a fluid in which the substance is insoluble, thereby forming a dispersion of very small particles of the substance in the fluid, and
    pumping the fluid containing the dispersed substance to the subterranean location.

2. The method of claim 1 wherein the substance is hydrophobic and the fluid in which it is dispersed is aqueous.

3. The method of claim 1 wherein the concentration in the dispersed substance in the fluid is not more than 1 wt %.

4. The method of claim 1 wherein the dispersed particles of the substance have a particle size not greater than 800 nanometers.

5. The method of claim 1 wherein the dispersed particles of the substance have a particle size in a range from 1 nanometer to 500 nanometers.

6. The method of claim 1 wherein, after the fluid has reached a subterranean location, the dispersed substance migrates into another fluid encountered at that location.

7. The method of claim 6 wherein the dispersed substance is a tracer and the method includes detecting the tracer in fluid produced from the subterranean location.

8. The method of claim 7 wherein the dispersed particles of the tracer have a particle size not greater than 800 nanometers.

9. The method of claim 7 wherein the dispersed particles of the tracer have a particle size in a range from 1 nanometer to 500 nanometers.

10. The method of claim 1 wherein, after the fluid has reached a subterranean location, the dispersed substance interacts with one or more constituents of the fluid in which it was dispersed.

11. The method of claim 10 wherein the fluid contains a thickening polymer and the dispersed substance participates in cross linking of the polymer.

12. The method of claim 11 wherein the fluid contains an aldehyde or aldehyde precursor and the dispersed substance comprises a hydrophobic precursor for a phenolic compound.

13. The method of claim 12 wherein the fluid contains a formaldehyde precursor.

14. The method of claim 11 wherein the dispersed particles have a particle size not greater than 800 nanometers.

15. The method of claim 11 wherein the dispersed particles have a particle size in a range from 1 nanometer to 500 nanometers.

* * * * *